Dec. 20, 1927.

W. KÖCHLING 1,653,107

SINGLE PHASE TRANSFORMER

Filed May 17, 1927

Inventor:
Wilhelm Köchling,
by
His Attorney.

Patented Dec. 20, 1927.

1,653,107

UNITED STATES PATENT OFFICE.

WILHELM KÖCHLING, OF WAIDMANNSLUST-BERLIN, GERMANY ASSIGNOR TO GENERAL ELECTRIC COMPANY, A CORPORATION OF NEW YORK.

SINGLE-PHASE TRANSFORMER.

Application filed May 17, 1927, Serial No. 192,129, and in Germany June 11, 1926.

My invention relates to single phase electrical induction apparatus. The magnetic core of a large single phase transformer or the like is usually constructed with two winding legs and its output or capacity is only about two thirds that of a similar three phase device with a core having three winding legs and the same height. The height of large capacity single phase apparatus of this character is therefore often so great as to be objectionable. The object of the invention is to provide an improved single phase transformer or the like of reduced height for a given capacity. In attaining this result, the invention provides a single phase transformer or the like having a magnetic core with an uneven number of winding legs such as three, five, and so forth, the windings being so arranged that the magnetic flux in adjacent winding legs flows in opposite directions.

Figure 1:
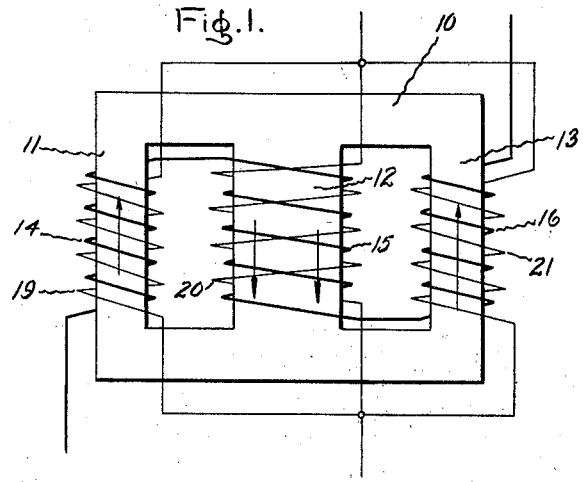
Figure 2:
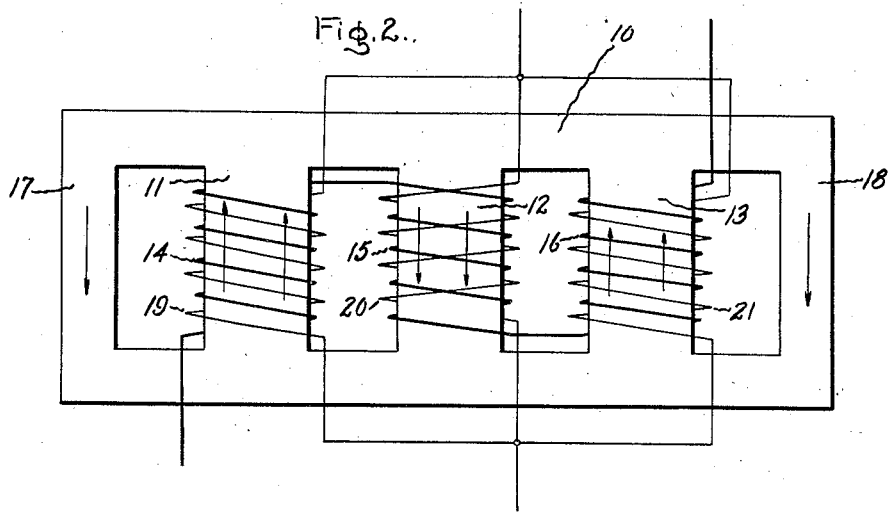

The invention and its advantages will be better understood from the following description taken in connection with the accompanying drawing in which Fig. 1 shows a single phase transformer with a three legged core constructed in accordance with the invention, and Fig. 2 shows a modified form of the invention comprising a five legged core.

Like reference characters indicate similar parts in both figures of the drawing.

The particular form of transformer shown in Fig. 1 comprises a core 10 having three winding legs 11, 12 and 13 surrounded respectively by three series connected sections 14, 15 and 16 of one of the transformer windings. These winding sections 14, 15 and 16 are so connected that the direction of current in the section 15 around the center winding leg 12 is opposite that in the sections 14 and 16 around the outer winding legs 11 and 13. This causes the magnetic flux at any instant to flow in the center winding leg 12 in a direction opposite to that of the flux in the adjacent outer winding legs 11 and 13 as indicated by arrows in the drawing. The flow of magnetic flux in each of the outer winding legs 11 and 13 is of course only approximately one half that in the center winding leg 12 so that the cross section of the outer legs should be only one half that of the center leg. The thickness of all three winding legs must be the same, however, because the core must be built up of laminations to prevent excessive eddy current losses. Now it is often desirable that the winding turns be circular and therefore that the winding legs be of generaly circular cross section to support the windings properly. But it is obvious that if the outer winding legs are of the same thickness but of only one half the cross section of the center leg, not all three winding legs can have a generally circular cross section. For this reason it is often desirable to provide at each end of the core an additional core leg without any winding as shown in Fig. 2, the result being a core substantially like that commonly used for large three phase transformers.

In the form of transformer shown in Fig. 2, the three inner winding legs are all of the same size and shape in cross section as they all carry the same amount of magnetic flux. The fact that the cross section of each of the additional outer core legs 17 and 18 is only one half that of the inner winding legs is not objectionable for these outer core legs are not provided with windings and so there is no objection to their being rectangular in cross section.

The reluctance of the magnetic path through either outer core leg 17 or 18 and the adjacent winding leg 11 or 13 is greater than that of the magnetic path through the adjacent winding legs 11 and 12 or through the adjacent winding legs 12 and 13 and there are fewer ampere turns available to induce flux through either of the outer core legs than through either pair of adjacent winding legs. The magnetic lines of force will therefore tend to concentrate through the winding legs and will not be distributed between the outer legs and the winding legs in proportion to their respective cross sections unless further provision is made to attain this distribution. To decrease the reluctance of the outer core legs 17 and 18 by increasing their cross section would be uneconomical and the desired flux distribution may be much more effectually attained by providing the winding legs 11, 12 and 13 with additional windings 19, 20 and 21 respectively, all these additional windings having the same number of turns and being connected in parallel. Such additional windings are frequently provided for other purposes so that the desired core flux distribution would be attained with no additional expense. If one of the main transformer windings, either primary or secondary, comprises parallel connected windings on the several winding legs, then this winding will produce the desired core flux distribution and no additional winding will be necessary for this purpose.

A core having an uneven number of winding legs (that is, three, five and so forth) may be used if desired either to increase the capacity of the transformer without increasing its height or to reduce its height without reduction in capacity. At the same time, if additional outer core legs without windings are used as in Fig. 2, the magnetic material in the core will be used more economically because the proportion of material in the additional outer legs which are not provided with windings will be reduced as compared with the total amount of material in the core.

As the sections of at least the high voltage winding on the several winding legs will preferably be connected in series, the maximum difference between the voltages of adjacent winding sections will be reduced as the number of winding legs is increased so that the winding sections may be closer together and the openings or windows between adjacent winding legs made smaller.

The invention has been explained in connection with what are now considered its most desirable forms as applied in a transformer, but it will be apparent that various changes may be made within the scope of the invention as defined in the appended claims.

What I claim as new and desire to secure by Letters Patent of the United States, is:

1. An electrical induction apparatus comprising a magnetic core, said core having an uneven number of winding legs, and a single phase winding having a section surrounding each of said winding legs, said winding sections being connected in series and arranged to carry current in opposite directions around adjacent winding legs, whereby the directions of the magnetic flux are opposite at any instant in adjacent winding legs.

2. An electrical induction apparatus comprising a magnetic core, said core having an uneven number of winding legs and two additional outer core legs, and a single phase winding having a section surrounding each of said winding legs, said winding sections being connected in series and arranged to carry current in opposite directions around adjacent winding legs, whereby the directions of the magnetic flux are opposite at any instant in adjacent winding legs.

3. An electrical induction apparatus comprising a magnetic core, said core having an uneven number of winding legs, a winding having a section surrounding each of said winding legs, said winding sections being connected in series, and a second winding also having a section surrounding each of said winding legs, the sections of said second winding being connected in parallel, each of said windings having its sections connected to carry current in opposite directions around adjacent winding legs, whereby the directions of the magnetic flux are opposite at any instant in adjacent winding legs.

4. An electrical induction apparatus comprising a magnetic core, said core having an uneven number of winding legs and two additional outer core legs, a winding having a section surrounding each of said winding legs, said winding sections being connected in series, and a second winding also having a section surrounding each of said winding legs, the sections of said second winding being connected in parallel, each of said windings having its sections connected to carry current in opposite directions around adjacent winding legs, whereby the directions of the magnetic flux are opposite at any instant in adjacent winding legs.

In witness whereof, I have hereunto set my hand this 28th day of April, 1927.

WILHELM KÖCHLING.